(12) United States Patent
Bridges et al.

(10) Patent No.: US 11,409,587 B2
(45) Date of Patent: Aug. 9, 2022

(54) SYSTEM AND METHOD FOR PREDICTIVE TECHNOLOGY INCIDENT REDUCTION

(71) Applicant: JPMORGAN CHASE BANK, N.A., New York, NY (US)

(72) Inventors: Michael Bridges, Broadstone (GB); Nicholas Midgley, Waterlooville (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/112,675

(22) Filed: Dec. 4, 2020

(65) Prior Publication Data

US 2021/0117256 A1    Apr. 22, 2021

Related U.S. Application Data

(63) Continuation of application No. 16/015,871, filed on Jun. 22, 2018, now Pat. No. 10,866,848.

(60) Provisional application No. 62/523,945, filed on Jun. 23, 2017.

(51) Int. Cl.
| | |
|---|---|
| *G06F 11/00* | (2006.01) |
| *G06N 7/00* | (2006.01) |
| *G06N 20/00* | (2019.01) |
| *G06F 11/36* | (2006.01) |

(52) U.S. Cl.
CPC .......... *G06F 11/004* (2013.01); *G06F 11/008* (2013.01); *G06F 11/3604* (2013.01); *G06N 7/005* (2013.01); *G06N 20/00* (2019.01); *G06F 2201/865* (2013.01)

(58) Field of Classification Search
CPC ... G06F 11/004; G06F 11/008; G06F 11/3604
See application file for complete search history.

(56) References Cited

U.S. PATENT DOCUMENTS

| | | |
|---|---|---|
| 8,060,440 B2 | 11/2011 | Oppenheimer et al. |
| 8,112,510 B2 | 2/2012 | Alon et al. |
| 8,230,268 B2 | 7/2012 | Nemecek et al. |

(Continued)

OTHER PUBLICATIONS

International Search Report, dated Sep. 17, 2018, from corresponding International Application No. PCT/PCT/US2018/038985.

(Continued)

*Primary Examiner* — Nadeem Iqbal
(74) *Attorney, Agent, or Firm* — Greenberg Traurig LLP

(57) ABSTRACT

Systems and methods for predictive technology incident reduction are disclosed. In one embodiment, in an information processing apparatus comprising at least one computer processor, a method for predictive technology incident reduction may include: (1) receiving a change record for a proposed change to a computer application or a computer network infrastructure; (2) analyzing the potential change for an adverse potential cross impact with another computer application or a computer system; (3) predicting a probability of failure and an impact of the proposed change using a model; (4) in response to a low predicted probability of failure, or a high predicted probability of failure with a low predicted impact: approving the proposed change; and implementing the proposed change; and (5) in response to a high predicted probability of failure and a high predicted impact, rejecting the proposed change.

19 Claims, 6 Drawing Sheets

(56) References Cited

U.S. PATENT DOCUMENTS

| | | |
|---|---|---|
| 8,443,690 B2 | 5/2013 | Koga |
| 8,655,705 B2 | 2/2014 | Riepshoff et al. |
| 9,244,803 B2 | 1/2016 | Adachi et al. |
| 2007/0100712 A1 | 5/2007 | Kilpatrick et al. |
| 2008/0126881 A1* | 5/2008 | Bruckhaus ............ G06F 11/008 714/47.2 |
| 2011/0282817 A1 | 11/2011 | Nemecek et al. |
| 2011/0283146 A1 | 11/2011 | Nemecek et al. |
| 2013/0138801 A1 | 5/2013 | Maralack et al. |
| 2014/0046879 A1* | 2/2014 | MacLennan ......... G06Q 10/067 706/12 |
| 2015/0019912 A1 | 1/2015 | Darling |
| 2015/0082277 A1 | 3/2015 | Champlin-Scharff |
| 2015/0310332 A1 | 10/2015 | Kupershtok et al. |
| 2016/0350671 A1 | 12/2016 | Morris, II |

OTHER PUBLICATIONS

Written Opinion of the International Searching Authority, dated Sep. 17, 2018, from corresponding International Application No. PCT/PCT/US2018/038985.

Extended European Search Report, dated Feb. 16, 2021, from corresponding European Patent Application No. 18820972.0.

* cited by examiner

SYSTEM AND METHOD FOR PREDICTIVE TECHNOLOGY INCIDENT REDUCTION

RELATED APPLICATIONS

This application is a Continuation of U.S. patent application Ser. No. 16/015,871, filed Jun. 22, 2018, now U.S. Pat. No. 10,866,848, which claims priority to U.S. Provisional Patent Application Ser. No. 62/523,945, filed Jun. 27, 2017, the disclosure of each of which is hereby incorporated by reference in its entirety.

BACKGROUND OF THE INVENTION

1. Field of the Invention

The present disclosure generally relates to systems and methods for predictive technology incident reduction.

2. Description of the Related Art

Technology incidents (e.g., application downtime, network outages, etc.) are typically managed after they occur. Technology incidents may be the result of a change that is necessary to meet client, consumer, and regulatory needs; a component failure; the emergence of a known issue, defect, exposure, etc.; the emergence of a latent problem that may emerge in response to a certain condition; etc. Because they are managed after they occur, significant productivity may be lost.

SUMMARY OF THE INVENTION

Systems and methods for predictive technology incident reduction are disclosed. In one embodiment, in an information processing apparatus comprising at least one computer processor, a method for predictive technology incident reduction may include: (1) receiving a change record for a proposed change to a computer application or a computer network infrastructure; (2) analyzing the potential change for an adverse potential cross impact with another computer application or a computer system; (3) predicting a probability of failure and an impact of the proposed change using a model; (4) in response to a low predicted probability of failure, or a high predicted probability of failure with a low predicted impact: approving the proposed change; and implementing the proposed change; and (5) in response to a high predicted probability of failure and a high predicted impact, rejecting the proposed change.

In one embodiment, the model may be selected by a learning engine based on a prior implemented change and a failure and an impact of the prior implemented change.

In one embodiment, the model may include at least one of a Naïve Bayes algorithm, a k-nearest neighbors algorithm, logistic regression, and an ensemble classifier.

In one embodiment, the model may be selected by providing test data to a plurality of models, and selecting the model based on the results of the test data.

In one embodiment, the predicted probability of failure and the predicted impact of the proposed change may be based on at last one of current change data, change history data, configuration management data, incident and problem management data, stability and resiliency management data, application and infrastructure defect data, risk and security management data, and market data.

In one embodiment, the proposed change may be received in a batch comprising a plurality of proposed changes.

In one embodiment, the method may further include requesting additional information necessary to complete the proposed change when the proposed change is incomplete.

In one embodiment, the method may further include monitoring an actual failure and an actual impact of the implemented proposed change; and scoring the model based on the actual failure and the actual impact.

In one embodiment, the method may further include selecting a new model in response to the score being below a predetermined threshold. The new model may be selected by: using unsupervised or semi-supervised machine learning to a dataset to determine a feature set for a new model; retrieving a plurality of supervised machine learning models; training and testing the supervised machine learning models in parallel using the selected feature set; and selecting the new model based on the training and testing.

According to another embodiment, a system for predictive technology incident reduction may include a service management system comprising at least one computer processor and executing a change screening module and a change management module; a learning engine module; and a change implementation module. The change screening module may receive a change record for a proposed change to a computer application or a computer network infrastructure, may analyze the potential change for an adverse potential cross impact with another computer application or a computer system, and may predict a probability of failure and an impact of the proposed change using a model selected by the learning engine module. In response to a low predicted probability of failure, or a high predicted probability of failure with a low predicted impact, the change management processor may approve the proposed change and the change implementation module may implement the proposed change. In response to a high predicted probability of failure and a high predicted impact, the change management processor may reject the proposed change.

In one embodiment, the learning engine module may select the model based on a prior implemented change and a failure and an impact of the prior implemented change.

In one embodiment, model may include at least one of a Naïve Bayes algorithm, a k-nearest neighbors algorithm, logistic regression, and an ensemble classifier.

In one embodiment, the learning engine module may select the model by providing test data to a plurality of models, and selects the model based on the results of the test data.

In one embodiment, the predicted probability of failure and the predicted impact of the proposed change may be based on at last one of current change data, change history data, configuration management data, incident and problem management data, stability and resiliency management data, application and infrastructure defect data, risk and security management data, and market data.

In one embodiment, the proposed change may be received in a batch comprising a plurality of proposed changes.

In one embodiment, the change screening module may compare at least one of the predicted probability of failure and the predicted impact of the proposed change to a human assessment.

In one embodiment, the change screening processor may request additional information necessary to complete the proposed change.

In one embodiment, the learning engine module may monitor an actual failure and an actual impact of the implemented proposed change and scores the model based on the actual failure and the actual impact.

In one embodiment, the learning engine module may select a new model in response to the score being below a predetermined threshold.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein related to systems and methods for predictive technology incident reduction, Embodiments disclosed herein may predict technology incidents pro-actively using, for example, technology application and infrastructure data, for example change, incident, problem, capacity, configuration, stability, resiliency, and application defect records, infrastructure patching and end of life, etc. Embodiments may account for technology risk and security considerations, such as the presence of known security vulnerabilities within the infrastructure or application. Embodiments may also account for environmental and temporal considerations, such as the time of day (e.g., end of day), day of the month (e.g., end of month), day of year (e.g., end of year), market events (e.g., IMM high volume days, proximity to daily market cutoffs, etc.), etc. Another embodiment may predict infrastructure or application failure by comparing the Mean Time Between Failure (MTBF) for components with their actual age and the pattern of alerts received from monitoring and logging systems.

Embodiments may use predictive analytics and/or machine learning and/or the wider field of Artificial Intelligence (AI) to identify and prevent or reduce the likelihood that a technology incident will occur. This is a pro-active approach rather than a re-active approach.

Embodiments may use a wide range of data, such as incident, problem, change, capacity, configuration, stability, etc. that may be combined with environmental and temporal considerations and with risk and security information.

In embodiments, machine learning algorithms or models may be trained and tested on data sources and applied to identify anticipated, scheduled, or otherwise expected change events that may have risk above a predetermined threshold. In embodiments, a notification may be provided informing the sponsor of the change event of the risk and one or more actions to take to minimize the risk. In one embodiment, the action(s) may be based on successful actions taken for similar change events.

In one embodiment, the system may automatically apply the action without human intervention.

Figure 1:
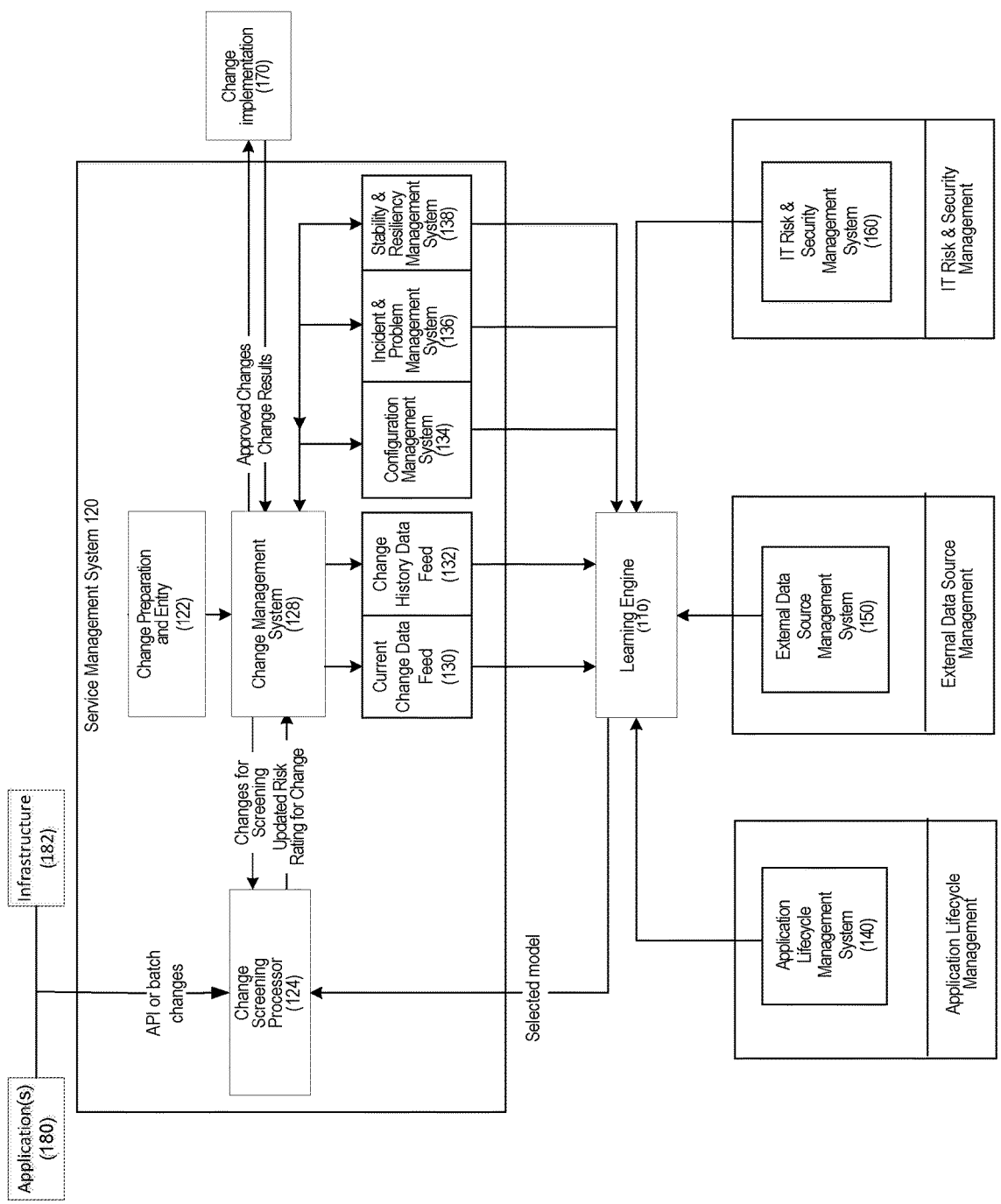
FIG. 1 depicts a method for predictive technology incident reduction according to one embodiment.

Referring to FIG. 1, a system for technology incident reduction is disclosed according to one embodiment. System 100 may include service management system 120, application lifecycle management system 140, external data sources 150, and risk and security management system 160.

In one embodiment, service management system 120 may include, for example, change preparation and entry module 122, change screening processor 124, change management system 128, current change data feed 130, change history data feed 132, configuration management system 134, incident and problem management system 136, and stability and resiliency management system 138.

In one embodiment, application lifecycle management system 140 may include, for example, one or more of demand management, requirements management, architecture, design, coding, testing, quality assurance, defect management, user acceptance, software maintenance (licensing, patching and upgrades), continuous integration and deployment management.

In one embodiment, risk and security management system 160 may provide, for example, risk and controls management, cyber security management, identity and access management, etc. This may be in relation to determining whether known vulnerabilities are present in the infrastructure or application, the nature and volume of ongoing cyber incidents, whether controls or are in place to mitigate known technology risks, etc.

External data sources 150 may include, for example, information provided by regulators, exchanges, financial market data vendors or other third parties, etc. This may be in relation to provision of actual or expected transaction volumes, changes to market cut-offs and changes to national holidays, etc.

In one embodiment, change preparation and entry module 122 may include system(s) to raise and record details of the required change. It may provide a user interface to input current change data.

In one embodiment, change management system 128 may include, for example, system(s) to manage the planning, control and approval of application or infrastructure changes into test or production environments.

In one embodiment, change screening processor 124 may screen the current change data using an algorithm or model that may be provided by learning engine 110. In one embodiment, change screening processor 124 may flag alerts of varying severity against changes deemed to carry excessive risk by the change screening processor. These alerts may then be processed by change workflow management system 128. These alerts may also lead to further due diligence and quality control tasks being applied to flagged changes and to additional higher level approvals being required for such changes.

In one embodiment, if approved, the change may be implemented by change implementation module 170.

The alerts may also lead to the change being prevented from being deployed into a production environment until required improvements or changes have been applied. In another embodiment, change screening processor 124 may monitor change input in real time and alert the end-user to areas of excessive risk or to existing changes which would adversely cross-impact the change being input.

In one embodiment, current change data 130 may represent a current change, including, for example, one or more of change record ID; change raiser, owner, requester and approvers; change title, summary and description; the change schedule (e.g., the planned start and end date (and time) of change deployment); actual change start and end dates and times; change record creation date, requested by date; business units, locations, regions, customer groups and clients affected; systems, services, applications and configuration items affected; priority, urgency, impact and risk of making the change; category of change with associated lead time (e.g., indicating whether normal, expedited or emergency); change status (e.g., indicating whether in draft, review, pending approval, ready to implement, implementation in progress, closed or cancelled); tasks required (e.g., including resources assigned to tasks, task actions required, start and completion times); change approval records including assignment, comments and status; change implementation plan, backout and test plans and post implementation validation plan; change drivers (e.g., indicating whether new business requirement, enhancement, bug-fix or emergency change to recover an incident); planned outages required (e.g., start and end dates and times); Change Advisory Boards (CAB) completed (e.g., local, regional, and enterprise level CABs); change restrictions in force; related requirements, backlog codes, project codes and program codes; change compliance (e.g., indicating whether change in compliance with change management rules); change success indicator (e.g., populated post implementation indicating success or failure); change incident indicator (e.g., populated post implementation with details of any incidents caused by the change); change management Key Performance Indicators (KPIs) and metrics, etc.

In one embodiment, change history data 132 may include a history of changes in the system, including any technology incidents that occurred as a result of the change. In one embodiment, information regarding any remedial action that was performed following the technology incident may be included.

In one embodiment, configuration management data 134 may specify a current configuration for elements in the system.

In one embodiment, incident and problem management data 136 may include, for example, one or more of incident, ticket or problem ID; priority and severity (e.g., initial, highest and on closure); status to indicate whether new, cancelled, assigned, active, in progress, awaiting user information, awaiting evidence, recovered, resolved or closed; title, summary and description; open date and time; date and time recovered, resolved and closed; target Service Level Agreement (SLA) time and actual time to recover (TTR) incident; target SLA time and actual time to resolve problem; assignment group and owning individual; VIP/Key Customer flag; business units, locations, regions, customer groups and clients impacted; systems, services, applications and configuration items impacted; error code, sub-code and root cause code; accountable system, service, application, configuration item and component; accountable business unit, region, assignment group, supplier and individual; related incidents, problems, known errors, changes, requirements, backlog codes, project codes and program codes; incident detection method (e.g., via service desk, monitoring alert or automated ticketing); financial, regulatory and reputational impacts; overall incident recovery and problem resolution costs; incident and problem histories and audit trails; repeat incident and problem flags; parent incident and problem IDs; child incident and problem IDs; incident recovery contacts and participants; problem resolution contacts and participants; incident recovery tasks; problem root cause analysis actions; incident recovery KPIs and metrics; problem resolution KPIs and metrics, etc.

In one embodiment, stability and resiliency management data 138 may include, for example, one or more of KPIs and metrics for stability threats, exposures, known vulnerabilities and workarounds; stability action plans; component reliability; component maintainability and serviceability; system security; system availability; system resiliency (e.g., including service continuity management test results and compliance); capacity management (e.g., including performance management), etc.

In one embodiment, the best performing algorithm or model, or combinations of algorithms or models, may be used. For example, the learning engine may cycle thru a pre-determined set of algorithms or models and select the one which performs most effectively on the test data.

In one embodiment, impact analysis data may be received from change screening processor 124. This may include, for example, alerts flagging the IDs of current change records which the model predicts will fail or cause an incident. The alerts may also have an associated severity, dependent on the potential magnitude of adverse impacts and also indicate reasons for the alerting.

In one embodiment, application and infrastructure defect data 142 may include any known data regarding defects for applications, hardware, etc.

In one embodiment, market data 152 may include, for example, market events (e.g., IMM high volume days, proximity to daily market cutoffs, etc.).

In one embodiment risk and security management data 162 may include, for example, a database of known security vulnerabilities present internally, a database of known external threats, a database of internal control breaks, risks and mitigations and a database of user identity and access entitlements.

In one embodiment, learning engine 110 may receive current change data, change history data, configuration management data, incident and problem management data, stability and resiliency management data, application and infrastructure defect data, risk and security management data, and market data, and may select and/or apply one or more algorithms or models to predict a technology incident. In one embodiment, machine learning from past technology incidents may be considered.

For example, one or more of the following algorithms or models may be used: decision trees, Naïve Bayes, k-nearest neighbors, logistic regression, ensemble classifiers, support vector classification/linear classification, neural networks. Other algorithms or models may be used as is necessary and/or desired.

In one embodiment, the programming languages Python and R may be used for predictive analytics/machine learning algorithms or models. In one embodiment, impact analysis data may be received from the analytics engine.

For example, changes may be received individually or in batch from one or more application 180, from infrastructure 182, from change preparation and entry 122, etc. The changes may be received by change screening processor 124, which may use the latest model from learning engine 110 to screen the changes.

Updated risk ratings for screened changes may be fed back to the change management system 128. Screened changes marked as not ready for approval (e.g., because the risk and impact of failure has been deemed too high) may need to be amended and rescreened. Screened changes marked as ready for approval may be sent to the approval function within the change management system 128. Approved changes may be passed to the change implementation module 170 for deployment. The results of the deployment may be fed back to the change management system 128.

Figure 2:
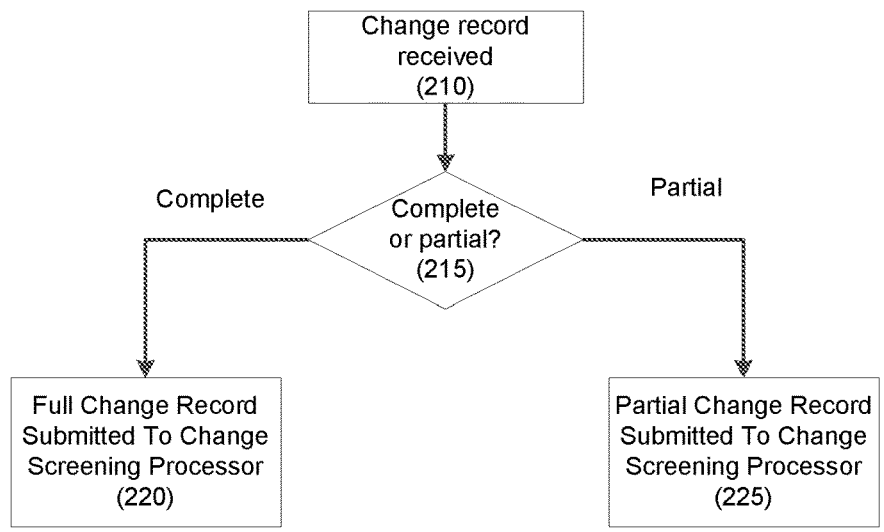
FIG. 2 depicts a process for record triage according to status (complete or partial) according to one embodiment.

FIG. 2 depicts a process for record triage according to status (complete or partial) according to one embodiment. In step 210, a change record may be received. In one embodiment, the change record may have been created by a user in the change preparation and entry module 122; in another embodiment, the change record may be received from external applications 180, infrastructure 182 by API feed, in batches, etc.

Figure 3A:
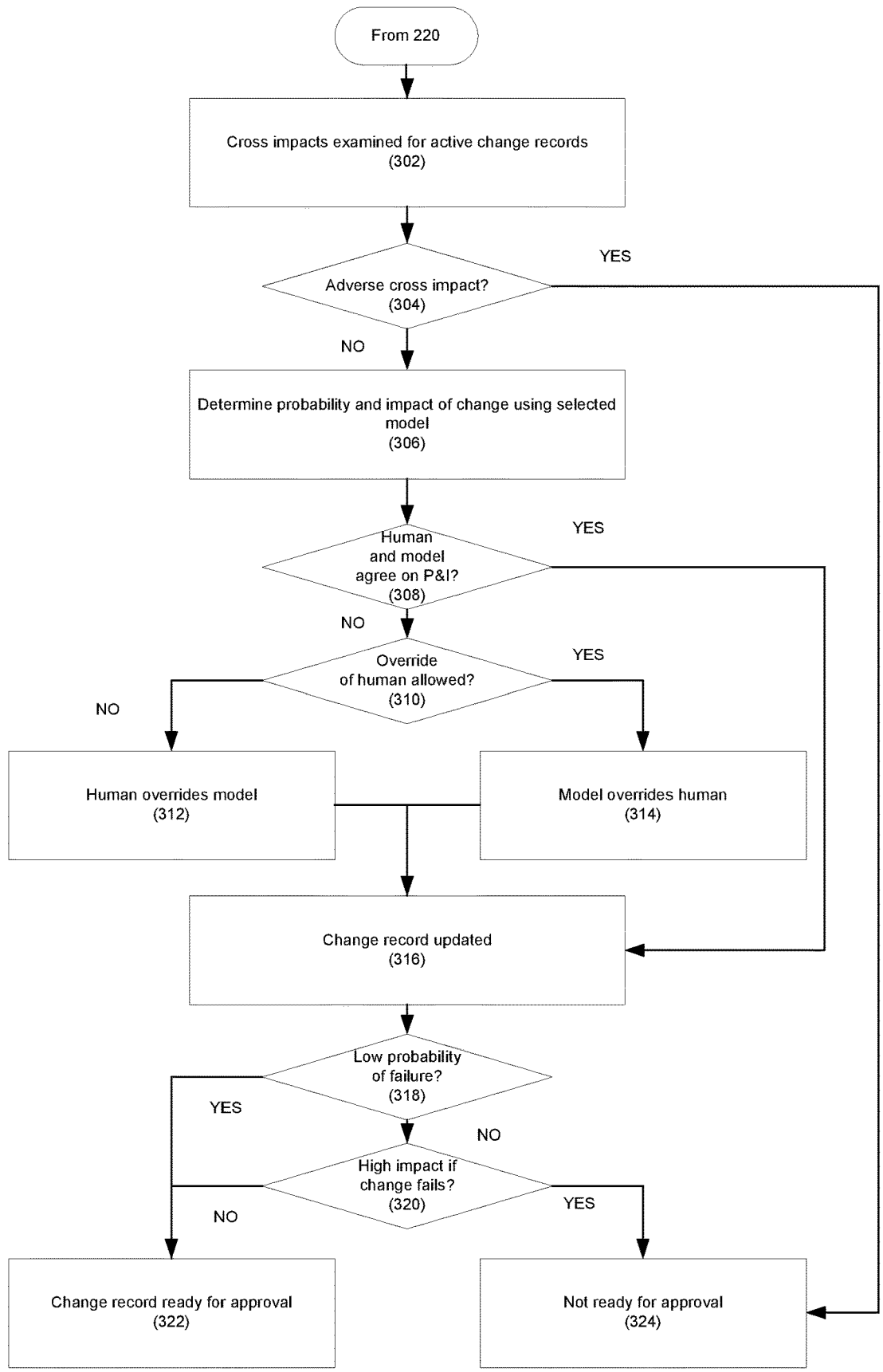
FIG. 3A depicts a method of processing a complete change record is disclosed according to one embodiment.
Figure 3B:
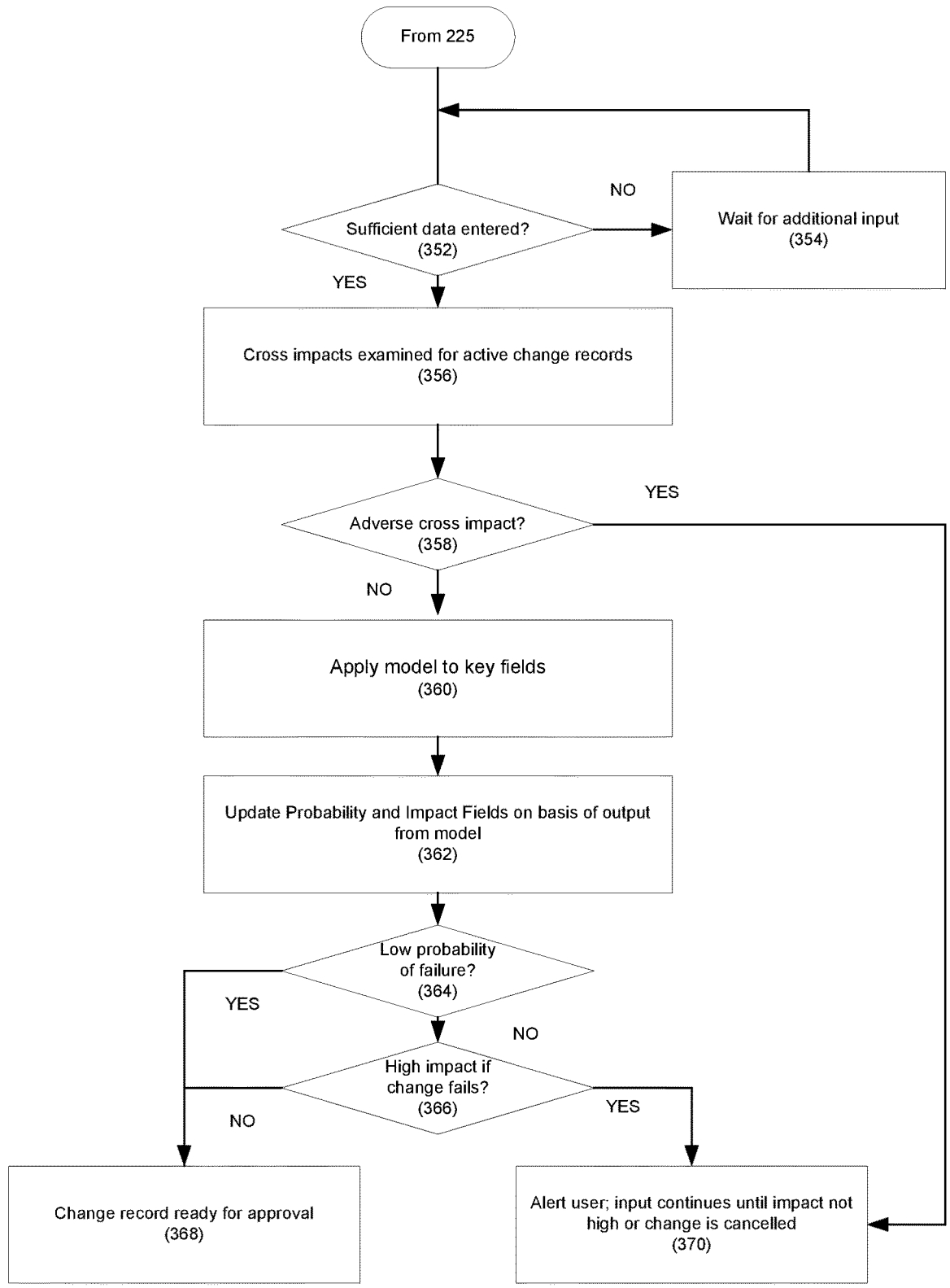
FIG. 3B depicts a method of processing a partial change record is disclosed according to one embodiment.

In step 215, if the change record is received from a system, or is received as a complete change record from a user, in step 220, the full change record may be submitted to the change screening processor. This process is depicted in FIG. 3A. If the change record is received as a partial change record from a user, the change record may be processed as a partial change record, and a real-time assessment may be provided by the change screening processor. This process is depicted in FIG. 3B.

Referring to FIG. 3A, a method of processing a complete change record is disclosed according to one embodiment.

In step 302, the change screening processor may analyze the change for potential cross impacts with other applications, systems, etc., and, in step 304, the change may be checked for adverse cross impacts. If there are no adverse cross impacts, in step 306, the system determines the probability and impact of the change using the selected model.

In step 308, the probability of failure and impact determined by the model is compared to the probability of failure and impact determined by human; if they do not agree, in step 310, the system determines whether to override the model. Thus, in step 312, the human will override the model, or in step 314, the model will override the human.

In step 316, the change record is updated, and if there is a low probability of failure in step 318, or if there is not a low probability of failure and not a high impact if the change fails in step 320, the change may be ready for approval in step 322. If there is not a low probability of failure in step 318, and there is a high impact if the change fails in step 320, the change is not ready for approval in step 324.

Referring to FIG. 3B, a method of processing a partial change record is disclosed according to one embodiment. In step 352, the change screening processor may determine whether a sufficient amount of data has been entered to evaluate the change. If not, in step 354, process waits until a sufficient amount of data has been entered.

If a sufficient amount of data has been entered, in step 356, the change screening processor may analyze the change for potential cross impacts with other applications, systems, etc., and, in step 358, the change may be checked for adverse cross impacts. If there are no adverse cross impacts, in step 360, the change screening processor may apply the selected model to key fields, and in step 362, may update the probability of failure and impact fields on the basis of the output of the model.

In step 364, if there is a low probability of failure, or if there is not a low probability of failure and not a high impact if the change fails in step 366, the change may be ready for approval in step 368. If there is not a low probability of failure in step 364, and there is a high impact if the change fails in step 366, the change is not ready for approval in step 370.

Figure 4:
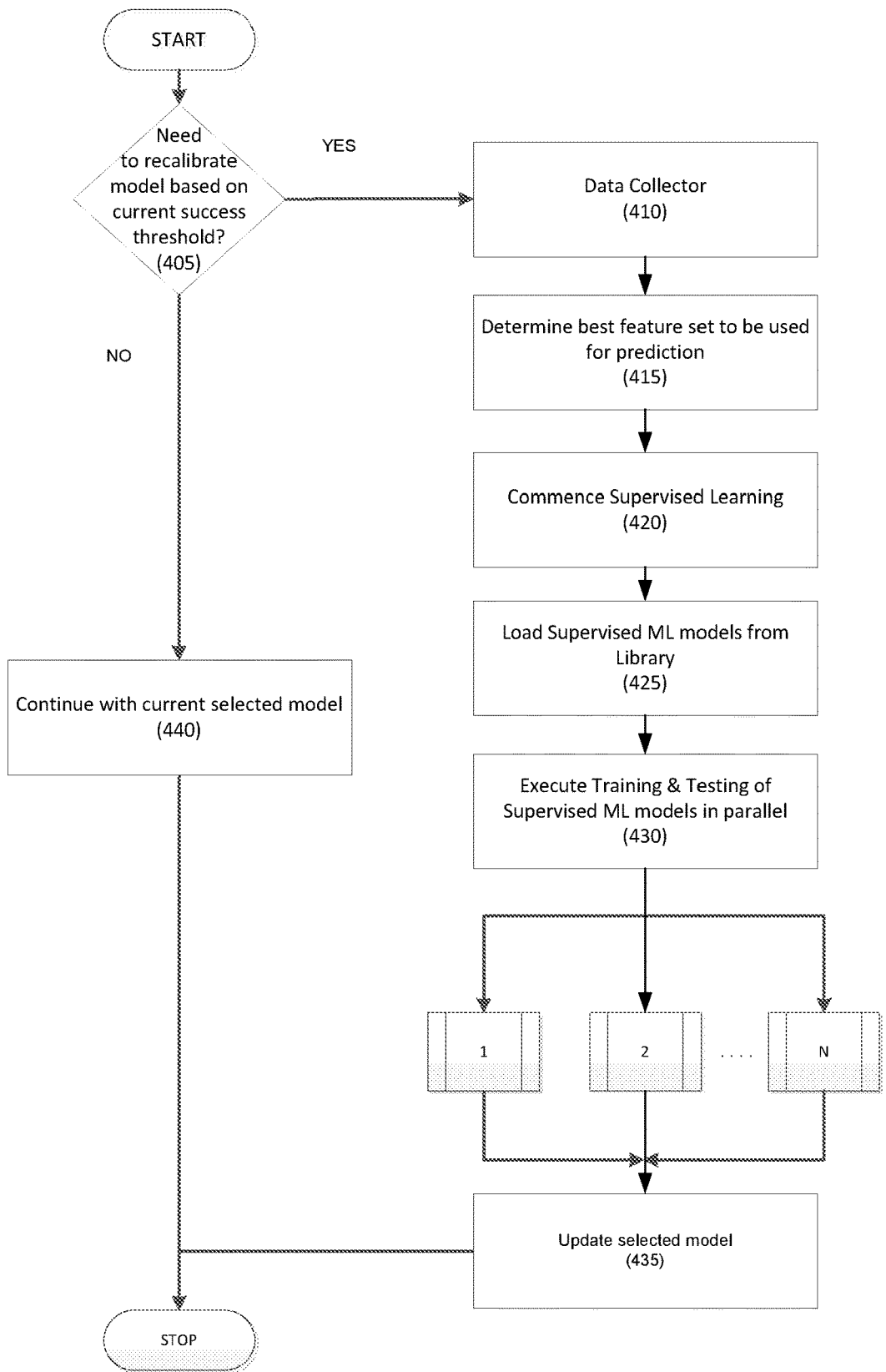
FIG. 4 depicts a learning process according to one embodiment.

FIG. 4 depicts a learning process according to one embodiment. In step 405, the learning engine may create and/or update the selected algorithm or model which is used to predict probability of change success or failure and potential adverse impact(s) of the change. In embodiments, the system may need to periodically recalibrate or update the selected algorithm or model based on the accuracy of predictions compared with actual outcomes.

Thus, the learning engine may use a scoring mechanism to keep track of its successes. If the score falls below an acceptable threshold, then the system actively recalibrates itself to determine the best algorithm/model and re-educates itself. Thus, in embodiments, the system is autonomic (i.e., self-educating).

If calibration is not necessary, in step 440, the current selected model is used.

If calibration is necessary, in step 410, the data collector may collect data. A data collection process is disclosed in FIG. 5 and discussed in detail below.

In step 415, the best feature set to be used for prediction may be selected. In one embodiment, unsupervised or semi-supervised machine learning (ML) may be applied to the dataset to determine best feature set to be used in supervised ML stage. Algorithms that may be used include, for example, Clustering, Bayesian Learning, Principal Component Analysis (PCA), Association Rules & Artificial Neural Networks (ANN). This may be performed in parallel for each model.

In step 420, supervised learning (e.g., training) may be performed to train the system, and in step 425, supervised machine learning models may be loaded from a library of algorithms (e.g., supervised machine learning models) discussed below. In one embodiment, loading may be done in parallel to facilitate rapid training and testing.

In step 430, training and testing of supervised machine learning models may be performed in parallel. For example, each algorithm may be trained and tested on the training and testing datasets using the most predictive features found in the step 415, above. Algorithms that may be used include, for example, Linear Regression, Logistic Regression, Decision Trees, Ensembles, Naïve Bayes, Nearest Neighbour, Support Vector Machines (SVM), Artificial Neural Networks (ANN) and Deep Learning. Results for both Classification (to predict change success or failure) and Regression (to predict a series of change failure probabilities and adverse change impacts) may be used.

Reinforcement Learning (RL) algorithms such as Q-Learning, Temporal Difference & Deep Adversarial Networks may also be used to observe the Change Environment. The decision making function may request the RL Agent to provide a prediction on the probability of change failure and possible adverse impact. The RL Agent's performance may be monitored and used in preference to other algorithms whenever it outscores them. The RL Agent may be reinforced accordingly, dependent on outcomes In step 435, based on the training and testing, the selected model may be updated.

Figure 5:
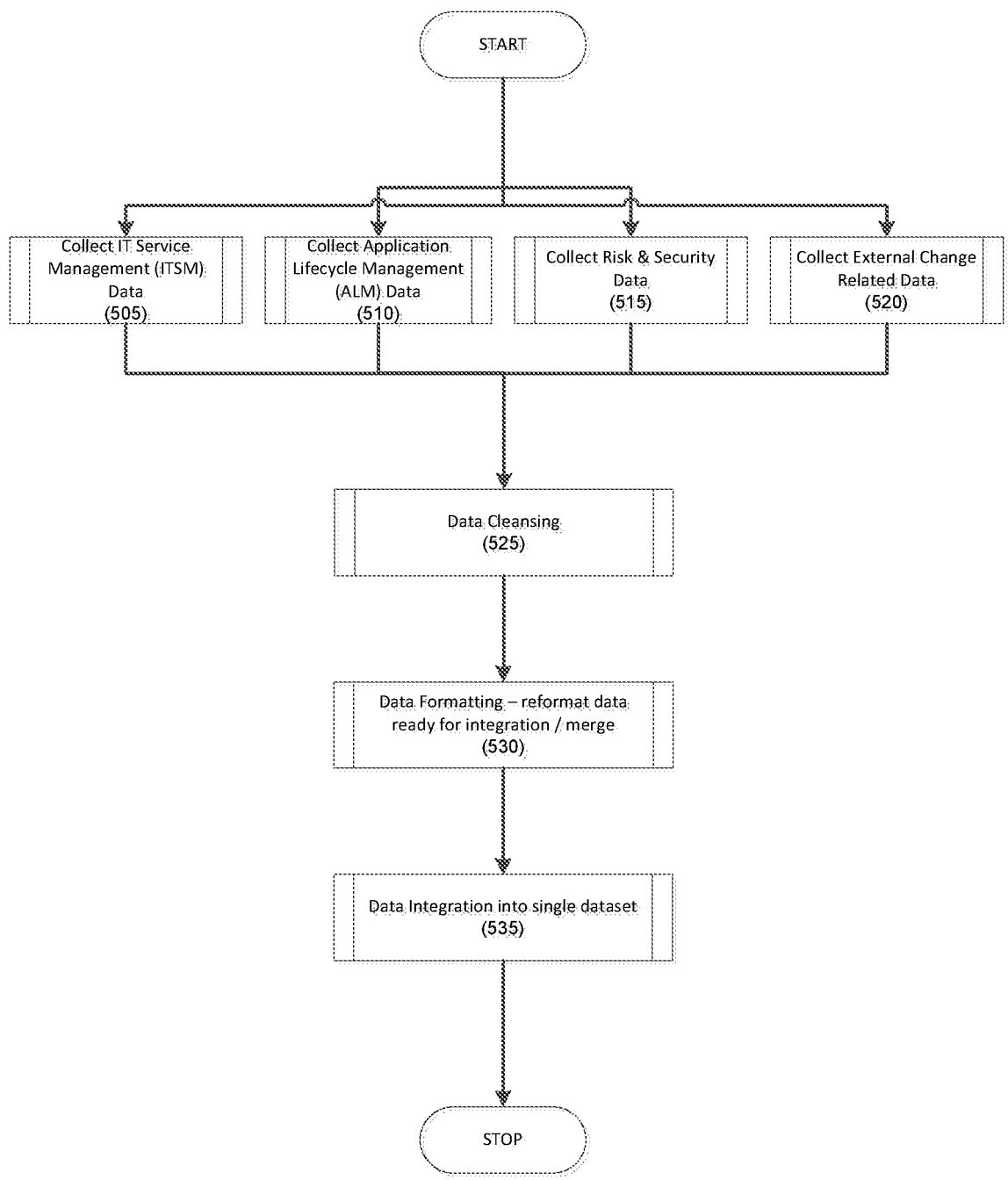
FIG. 5 depicts a data collection process according to one embodiment.

FIG. 5 depicts a data collection process according to one embodiment. In steps 505, 510, 515, and 520, data, such as IT service management data, application lifecycle management data, risk and security data, and external change related data may be collected. In step 525, the data may be cleansed, for example, by de-duplication; removing observations which are not relevant; correcting inconsistency of labels and input values; fixing structural errors in the data (e.g., misspelling and typographical issues) and flagging up missing data, and in step 530, the data may be formatted so that it is ready for integration or merger. Because the data used by the machine learning process is derived from many different sources it may be collected in a variety of file types and formats including, for example, databases, comma separated files, plain text files, XML files, documents and zipped or encrypted files. The data will need to be extracted from these files and consistently reformatted in a new dataset of the type used by the machine learning process.

In step 535, the data may be integrated into a single dataset. Once the source data has been reformatted into datasets of a file type and format which can be used by the machine learning process, these multiple datasets may then be merged into one consistent, integrated dataset.

Hereinafter, general aspects of implementation of the systems and methods of the invention will be described.

The system of the invention or portions of the system of the invention may be in the form of a "processing machine," such as a general purpose computer, a quantum computer, etc. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or a Quantum Computer, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system, the t|ket> operating system, or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming or quantum programming in the case of quantum computing. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, or encoded as qubits for a quantum computer, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, Q#, QCL, QML, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for predictive technology incident reduction, comprising:
   in an information processing apparatus comprising at least one computer processor:
      receiving a change record for a proposed change to a computer application or a computer network infrastructure;
      analyzing the proposed change for an adverse potential cross impact on another computer application or a computer system;
      predicting a probability of failure and an impact of the adverse potential cross impact on the other computer application or computer system using a model;
      in response to a low predicted probability of failure, or a high predicted probability of failure with a low predicted impact:
         approving the proposed change; and
         implementing the proposed change; and
      in response to a high predicted probability of failure and a high predicted impact, rejecting the proposed change.

2. The method of claim 1, wherein the model is selected by a learning engine based on a prior implemented change and a failure and an impact of the prior implemented change.

3. The method of claim 1, wherein the model comprises at least one of a Nave Bayes algorithm, a k-nearest neighbors algorithm, logistic regression, and an ensemble classifier.

4. The method of claim 1, wherein the model is selected by providing test data to a plurality of models, and selecting the model based on results of the test data.

5. The method of claim 1, wherein the predicted probability of failure and the predicted impact of the proposed change are based on at last one of current change data, change history data, configuration management data, incident and problem management data, stability and resiliency management data, application and infrastructure defect data, risk and security management data, and market data.

6. The method of claim 1, wherein the proposed change is received in a batch comprising a plurality of proposed changes.

7. The method of claim 1, wherein the proposed change is incomplete, and further comprising:
requesting additional information necessary to complete the proposed change.

8. The method of claim 1, further comprising:
monitoring an actual failure and an actual impact of the implemented proposed change; and
scoring the model based on the actual failure and the actual impact.

9. The method of claim 8, further comprising:
selecting a new model in response to the score being below a predetermined threshold.

10. A system for predictive technology incident reduction, comprising:
a service management system comprising at least one computer processor and executing a change screening module and a change management module;
a learning engine module; and
a change implementation module;
wherein:
the change screening module receives a change record for a proposed change to a computer application or a computer network infrastructure;
the change screening module analyzes the proposed change for an adverse potential cross impact on another computer application or a computer system;
the change screening module predicts a probability of failure and an impact of the adverse potential cross impact on the other computer application or computer system using a model selected by the learning engine module;
in response to a low predicted probability of failure, or a high predicted probability of failure with a low predicted impact:
the change management processor approves the proposed change; and
the change implementation module implements the proposed change; and
in response to a high predicted probability of failure and a high predicted impact, the change management processor rejects the proposed change.

11. The system of claim 10, wherein the learning engine module selects the model based on a prior implemented change and a failure and an impact of the prior implemented change.

12. The system of claim 10, wherein the model comprises at least one of a Nave Bayes algorithm, a k-nearest neighbors algorithm, logistic regression, and an ensemble classifier.

13. The system of claim 10, wherein the learning engine module selects the model by providing test data to a plurality of models, and selects the model based on results of the test data.

14. The system of claim 10, wherein the predicted probability of failure and the predicted impact of the proposed change are based on at last one of current change data, change history data, configuration management data, incident and problem management data, stability and resiliency management data, application and infrastructure defect data, risk and security management data, and market data.

15. The system of claim 10, wherein the proposed change is received in a batch comprising a plurality of proposed changes.

16. The system of claim 10, wherein the change screening module compares at least one of the predicted probability of failure and the predicted impact of the proposed change to a human assessment.

17. The system of claim 10, wherein the change screening model requests additional information necessary to complete the proposed change.

18. The system of claim 10, wherein the learning engine module monitors an actual failure and an actual impact of the implemented proposed change and scores the model based on the actual failure and the actual impact.

19. The system of claim 18, wherein the learning engine module selects a new model in response to the score being below a predetermined threshold.

* * * * *